Patented Nov. 14, 1922.

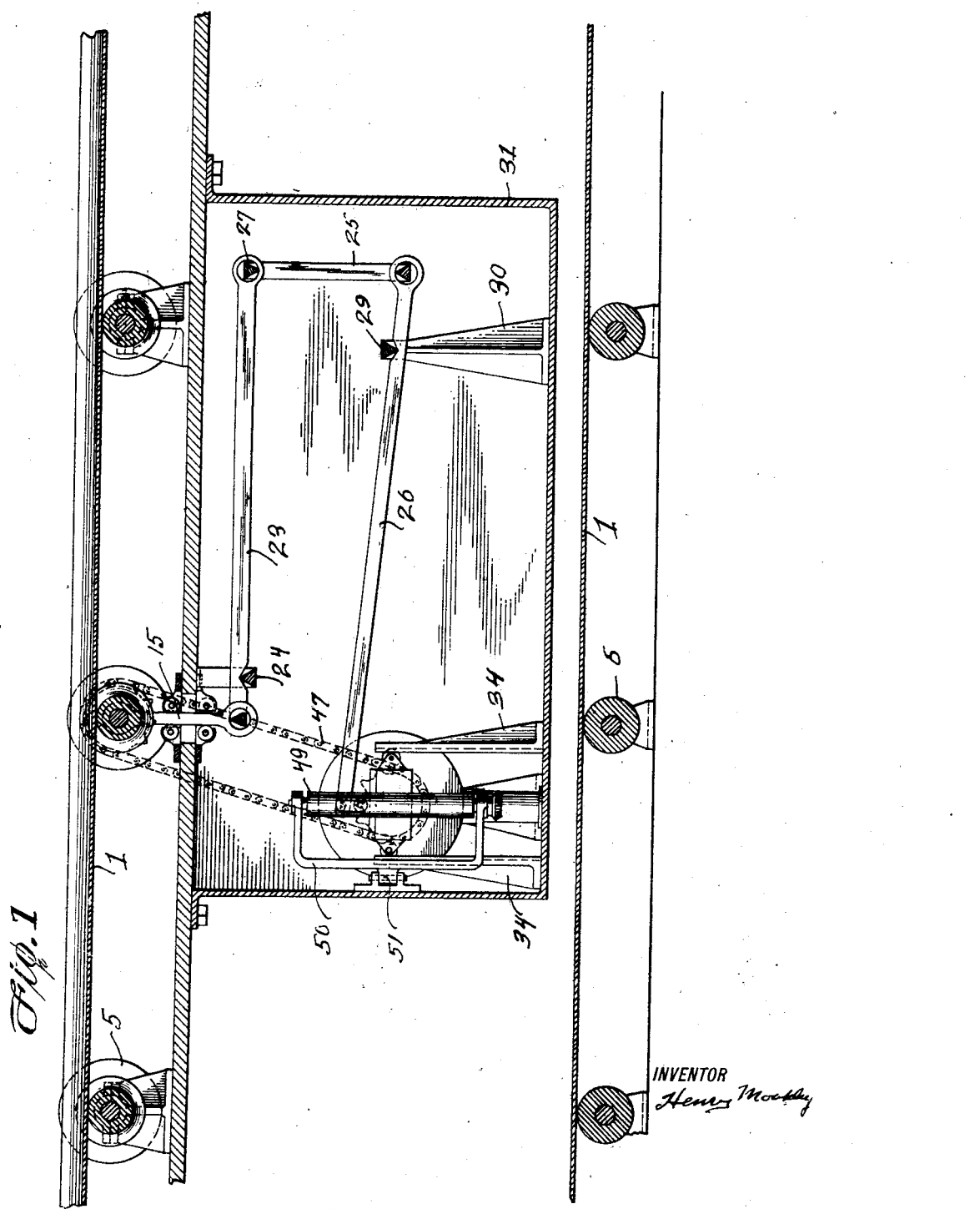

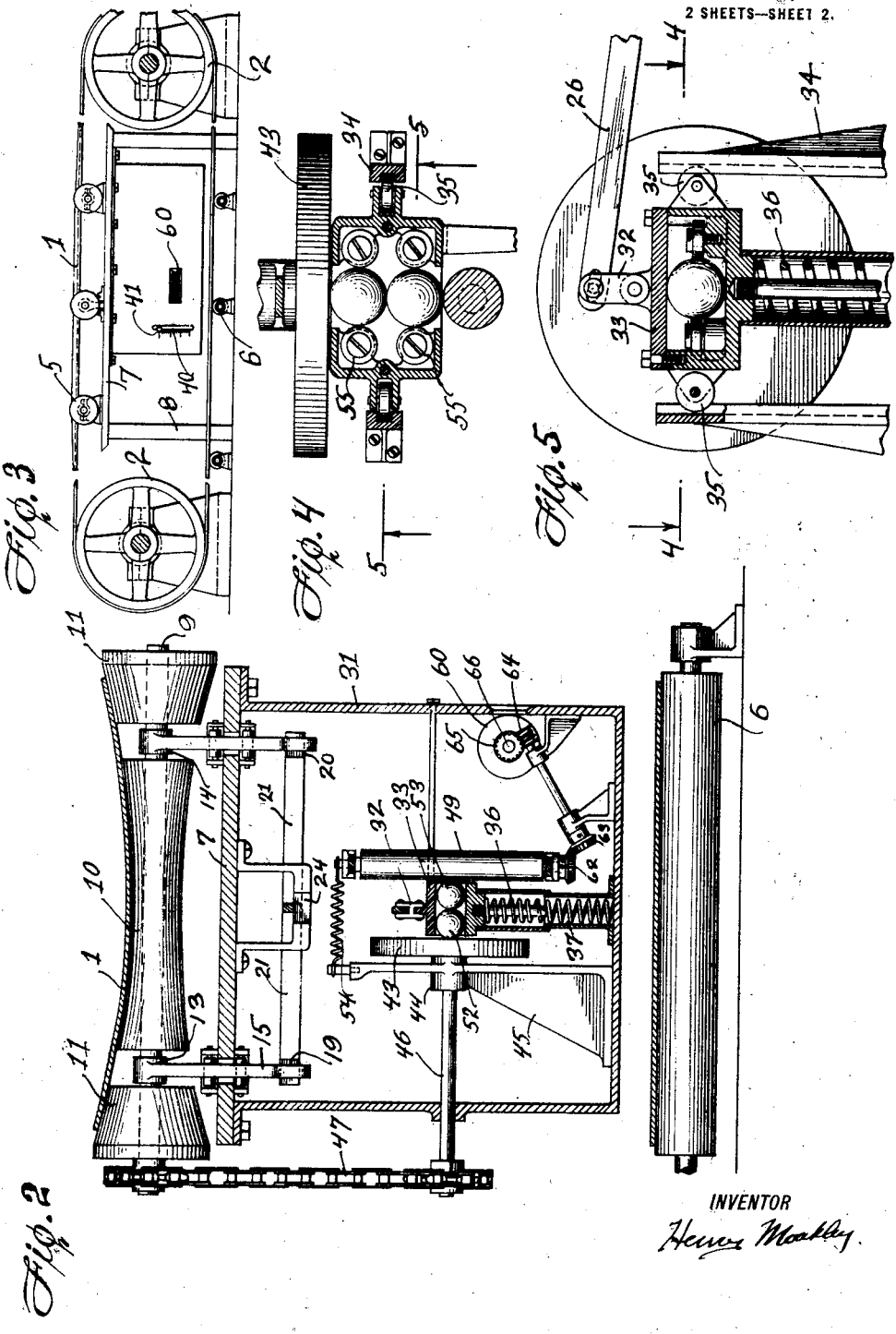

1,435,250

UNITED STATES PATENT OFFICE.

HENRY MOAKLEY, OF NEW YORK, N. Y., ASSIGNOR TO HANNIBAL C. FORD, OF NEW YORK, N. Y.

WEIGHING INSTRUMENT.

Application filed December 31, 1917. Serial No. 209,771.

*To all whom it may concern:*

Be it known that I, HENRY MOAKLEY, a citizen of the United States, residing at New York, in the county and State of New York, have invented new and useful Improvements in Weighing Instruments, of which the following is a specification.

This invention relates to instruments for weighing the total amount of material which flows or moves relatively to a given fixed point in any determined period of time; or in other words, an instrument which integrates the variable functions, weight and speed.

One object of the invention is to provide an instrument of this character, in which an integrating mechanism is used, which mechanism is so constructed that the parts always remain in continuous rolling contact without any slippage, whereby the accuracy of the machine may be materially increased.

Another object of the invention is to provide an instrument of this character, in which no appreciable strain or effort is placed upon the weighing mechanism by the integrating device, whereby the liability of error from this source is materially decreased.

A further object of the invention is to provide an instrument of this character, which is of a simple construction, with few movable parts.

With these and other objects in view, which will be hereinafter described in conjunction with the accompanying drawings, the instrument consists of the constructions and combinations which will be hereinafter set forth, and particularly pointed out in the appended claims.

One embodiment of the invention is particularly adapted for use with a traveling belt conveyor for the purpose of determining the total amount of material carried by the belt conveyor in any determined period of time and the invention will be described in conjunction with such a conveyor, it being understood that other embodiments of the invention may be constructed which are adapted for use where it is desired to multiply the weight of a moving mass of material by another factor.

In the drawings,

Figure 1 shows a longitudinal vertical section through a portion of a traveling conveyor having associated therewith a weighing instrument constructed in accordance with the principles of the invention;

Figure 2 is a transverse section through Fig. 1;

Figure 3 is an elevation showing the belt conveyor and weighing instrument in elevation, upon a reduced scale;

Figure 4 is a detail showing a horizontal section through the integrating mechanism, taken on the line 4—4 of Figure 5; and Figure 5 is a section taken on the line 5—5 of Figure 4.

Referring first to Figure 3 of the drawing, the traveling conveyor with which the weighing instrument is adapted to be used, may be of any usual construction and may comprise an endless belt or carrier 1, which is trained over pulleys or wheels 2, one or both of which wheels may be power driven. The upper or lower runs of the belt or carrier are supported by idlers 5 and 6, as is the usual construction. The weighing instrument which may be used with a belt conveyor of this character, is enclosed within a casing which is secured to a table or platform 7 supported on standards 8, the platform 7 forming the base or bed for the idlers 5. The idlers 5 for the upper run may be constructed as shown in Figure 2, consisting of a shaft 9, to which is fastened a middle roller 10 and two cone-shaped end rollers 11. One of these idlers, namely, the one shown in Figure 2, constitutes a part of the weighing instrument, the shaft 9 of this idler being carried by bearings 13 and 14 which are mounted at the upper ends of arms 15 and 16. The arms 15 and 16 pass through suitable openings in the platform or table 7 and are guided for vertical movement by the rollers 17. The lower ends of the arms 15 and 16 are provided with apertures or holes for the reception of the knife edges 19 and 20, which knife edges are carried at the ends of legs 21 and 22 and form a part of a T-shaped scale arm, the scale arm of which is designated 23. This scale arm is balanced upon a knife edge 24 which is carried by a suitable bracket secured to the under side of the platform or table 7.

The scale arm 23 is connected by means of a link 25 to a second scale arm 26, the link 25 being provided with knife edges 27 and 28, which fit into suitable apertures or holes in the ends of the scale arms.

The scale arm 26 is fulcrumed upon the knife edge 29, which is carried by a suitable yoke or bracket 30 secured to the bottom of the casing 31 of the weighing instrument. The free end of the scale arm 26 is secured by a short link 32 to a cage 33, which cage forms a part of the integrating mechanism, as will be later referred to. This cage moves vertically up and down in slides or guidways 34, the cage being preferably provided with rollers 35, which roll in these slideways. The cage 27 also forms the top of a spring balance consisting of a compression spring 36, one end of which bears against the bottom of the casing 31, and the other end of which bears against the case 27. To prevent this spring from buckling it may be surrounded by a cylindrical casing 37, which consists of two telescopic sections, one section being carried by the casing 31 and the other by the cage 33. It will therefore be seen that from the construction described, the weight of material upon the belt and over the movable idler will cause the weighing mechanism to be put into operation and by suitably proportioning the parts the cage 33 will have a vertical movement downwardly in proportion to the weight of the increments of the mass which is supported upon the belt 1 over the movable idler. As shown in Figure 2, there is no material upon the belt, so that the scale arm 26 is therefore under no tension, any weight upon the belt moving the cage 33 downwardly.

Since the movement of the cage 33 is proportional to the increments of weight carried by the belt over the movable idler, the instantaneous values of these increments may be read by means of the scale 40, over which travels a movable pointer 41 which is directly connected to the cage 33.

As is well known, the total weight of material which passes over the movable idler constituting a part of the weighing mechanism, is proportional not only to the weight of the material but is also proportional to the speed at which the belt is driven, and by integrating these two variables the total weight of material which passes over the belt may be determined. This is accomplished by means of any integrating mechanism which is a variable speed mechanism so constituted that its parts are in continuous rolling contact so that no appreciable additional effort or strain is placed upon the movable elements of the weighing mechanism, as thus described. This variable mechanism has one of its elements driven at a speed proportional to the speed of the driving element and has its speed changing device movable proportionately to the weight of material over the movable idler of the weighing mechanism. In this manner, the speed of the driven element of the variable speed mechanism will be proportionate to the product of both of these variables and hence by connecting this driven element to a suitable weight-indicating mechanism the summation or integration of the product of the instantaneous values of speed and weight may be obtained. This integrating mechanism will now be described.

The driving element in the embodiment shown comprises a disk 43 which is mounted in a bearing 44 carried by a bracket 45 extending upwardly from the bottom of the casing 31. This disk is mounted upon a shaft 46 which extends through the casing and is driven from the shaft 9 by means of sprockets and a chain 47, whereby the speed of the disk is directly proportional to the speed of the belt conveyor. The driven element of the variable speed mechanism comprises a cylinder 49 which is mounted in a yoke 50, the yoke 50 being preferably pivoted to the casing, as at 51. Interposed between the disk and the cylinder is the speed-changing device which, in the present construction, comprises a pair of balls 52 and 53, which balls are in rolling contact with each other and with the disk and cylinder, respectively. The balls, disk and cylinder are held in frictional engagement with each other by means of a spring 54, which spring is attached at one end to the bracket 45 and at its other end to the yoke 50 which carries the cylinder, the spring being exerted to force the cylinder against the balls and thus place a pressure upon all of the members of the variable speed mechanism to maintain them in frictional contact. The balls 52 and 53 are surrounded by the cage 33 which is interposed in and forms a part of the scale mechanism. The cage 33 carries rollers 55 which bear against the balls 52 and 53 and hold the balls so that their points of rolling contact with each other and with the disk and cylinder are in alignment, as shown in Fig. 4. The manner in which the instrument operates is obvious from the preceding description, and assuming that no weight is upon the conveyor and the conveyor is being driven, the parts will be in the position shown in Figure 2. Here the ball 52 is immediately over the center of the disk and hence is not rotated so that no movement is imparted to the driven element or cylinder 49. As the material is placed upon the belt the movable idler will be forced downwardly slightly to actuate the scale mechanism, which will push the cage 33 downwardly from the position shown in Fig. 3, and therefore move the balls from the center of the disk. The balls will then begin to rotate and the cylinder 49 will be driven, the speed of rotation of the cylinder being directly proportional to the product of the speed of the disk 43, and the displacement of the balls 52 and 53 from the center of the disk. Inasmuch as the speed of the disk 43 is proportional to the speed of the conveyor and the displacement of the ball 53 is directly proportional to the weight of each of the succeeding portions of material upon the belt over the movable idler, it is evident that the speed of the cylinder 49 is directly proportional to the product of these two, or in other words, the total angular displacement of the cylinder 49 will be proportional to the total quantity of material which passes over the movable idler forming a part of the scale mechanism. The angular movement of the cylinder 49 may be utilized for actuating a weight-indicating mechanism consisting of a range counter 60, which is driven by a suitable gearing, such as the beveled gears 62 and 63 and worm 64 and worm wheel 65, the worm wheel being carried by the shaft 66 of the weight-indicating mechanism, which may be of any suitable construction such as the ordinary counter. Any changes in the speed of the belt will directly affect the speed of rotation of the disk 43 and any changes in the increment of the mass of material over the movable idler of the weighing mechanism will cause the cage 33 to move toward or away from the center of the disk. This movement of the cage will not place any appreciable effort upon the scale mechanism since the two balls 42 and 43 always remain in rolling contact with the disk and cylinder without slipping, and since these two balls 52 and 53 are both spherical in shape, it is obvious that the bodily movement of the balls radially over the disk will not affect the speed of the driven element 45, the speed of this element being dependent entirely upon the distance which the ball 52 is from the center of the disk and upon the speed of the disk itself. The fact that the two balls 52 and 53 are interposed between the disk and driven element also insures that the parts of the variable speed mechanism will not slip under any conditions, and hence an accurate measurement of the weight of the material will always be had.

Other variable speed mechanisms may be utilized instead of the one shown, providing the parts always remain in rolling contact and providing also that the speed changing device is bodily movable, as for example, instead of utilizing two balls between the disk and cylinder the mechanism disclosed in my copending application Serial No. 208,273, filed December 21, 1917, may be utilized, and it is therefore not the intention to limit the invention to the particular embodiment described but only by the scope of the claims appended hereto. It is also obvious that the variable speed mechanism may be utilized with other types of scale than a conveyor scale, in which instance the disc would be driven by other means than the conveyor belt and it is intended that such modifications shall come within the purview of this invention.

I claim:

1. A machine for weighing material while in motion comprising a movable member whose displacements are proportional to the weights of successive portions of the material, a rotary member having a speed proportional to the rate of movement of the successive portions of material, a driving element connected to the rotary member, a driven element, a bodily movable speed changing device having its parts in rolling contact at all times with the driving and driven elements, means for connecting the device to the movable member, and weight indicating means actuated by the driven element.

2. In a machine for weighing material while in motion the combination with a weighing device having a movable part whose displacements are proportional to the weights of successive portions of the material and a rotary member having a speed proportional to the rate of movement of said portions, of a variable speed mechanism having a driving element connected to said rotary member, a driven element with weight-indicating means actuated thereby, and a bodily movable speed-changing device including a ball interposed between said driving and driven elements and actuated by said movable part of said weighing device.

3. In a machine for weighing material while in motion the combination with a weighing device having a movable part whose displacements are proportional to the weights of successive portions of the material and a rotary member having a speed proportional to the rate of movement of said portions, of a variable speed mechanism having a driving element connected to said rotary member, a driven element with weight-indicating means actuated thereby, and a bodily movable speed-changing device comprising a ball and a cage surrounding said ball and connections from said cage to said movable part of said weighing device.

4. In a machine for weighing material while in motion the combination with a weighing device having a movable part whose displacements are proportional to the weights of successive portions of the material and a rotary member having a speed proportional to the rate of movement of said portions, of a variable speed mechanism having a driving element connected to said rotary member, a driven element with weight-indicating means actuated thereby, one of said elements comprising a disk and a bodily movable speed-changing device including a spherical member adapted to travel across the face of said disk and means for driving said driven element at a speed proportional to the speed of said spherical member, a cage surrounding said spherical member, and connections from said cage to the movable part of said weighing device.

5. In combination with a weighing device having a part movable proportional to weight, a variable speed mechanism comprising a driving element and a driven member, a speed changing element comprising a pair of balls interposed between the driving element and the driven member, a connection between said part of said weighing device and one of said elements for moving it proportionally to the weight, a means for moving the other of said elements in proportion to another factor whereby said driven member has a movement proportional to the product of said weight and such factor.

6. In combination with a weigher having a part movable proportional to weight, a variable speed mechanism comprising a rotary driving element and a rotary driven member, a speed changing element interposed between said driving element and said driven member, having its parts in rolling contact with said driving element and said driven member at all times, means for connecting one of said elements to the said part of the weigher to have a movement proportional to weight, a means for moving the other of said elements proportionally to another factor whereby said driven member has a movement proportional to the product of the weight multiplied by said factor.

HENRY MOAKLEY.